(12) United States Patent
Buchhagen

(10) Patent No.: US 7,354,032 B2
(45) Date of Patent: Apr. 8, 2008

(54) PLATE SPRING, WHICH IS PREVENTED FROM BEING AXIALLY DISPLACED ON A CIRCULAR CYLINDRICAL SURFACE OF A RECEIVING BODY

(75) Inventor: Peter Buchhagen, Welzheim (DE)

(73) Assignee: Christian Bauer GmbH + Co., Welzheim (DE)

( * ) Notice: Subject to any disclaimer, the term of this patent is extended or adjusted under 35 U.S.C. 154(b) by 150 days.

(21) Appl. No.: 10/558,507

(22) PCT Filed: May 26, 2004

(86) PCT No.: PCT/DE2004/001097

§ 371 (c)(1),
(2), (4) Date: Nov. 28, 2005

(87) PCT Pub. No.: WO2004/106767

PCT Pub. Date: Dec. 9, 2004

(65) Prior Publication Data

US 2007/0051263 A1    Mar. 8, 2007

(30) Foreign Application Priority Data

May 26, 2003   (DE) ................. 103 23 577

(51) Int. Cl.
*F16F 1/18*   (2006.01)
(52) U.S. Cl. .................................... 267/160
(58) Field of Classification Search ......... 267/158–162
See application file for complete search history.

(56) References Cited

U.S. PATENT DOCUMENTS

| | | |
|---|---|---|
| 3,013,792 A | 4/1961 | Steinlein |
| 3,319,508 A | 5/1967 | McCormick |
| 3,320,846 A | 5/1967 | Orain |
| 4,364,615 A | 12/1982 | Euler |
| 5,269,499 A | 12/1993 | Schwab |

FOREIGN PATENT DOCUMENTS

| | | |
|---|---|---|
| AT | 198069 | 6/1958 |
| CH | 476204 | 9/1969 |
| DE | 512364 | 11/1930 |
| DE | 634 827 | 9/1936 |
| DE | 852 319 | 10/1952 |
| DE | 1 725 611 | 7/1956 |
| DE | 1 752 253 | 9/1957 |
| DE | 1 843 454 | 12/1961 |
| DE | 1145862 | 3/1963 |
| DE | 1 979 948 | 2/1968 |
| DE | 23 33 031 | 1/1975 |

(Continued)

*Primary Examiner*—Christopher P. Schwartz
(74) *Attorney, Agent, or Firm*—Collard & Roe, P.C.

(57) ABSTRACT

The invention relates to a plate spring that is prevented from being axially displaced on a surface of a receiving body, the surface being circular cylindrical at least in areas. The aim of the invention is to provide a plate spring of the aforementioned type that is able to maintain a securing against axial displacement with the least amount of effort. This is achieved by virtue of the fact that the edge of the plate spring radially facing the receiving body engages inside a peripheral groove provided in the receiving body.

5 Claims, 2 Drawing Sheets

FOREIGN PATENT DOCUMENTS

Figure 1B:
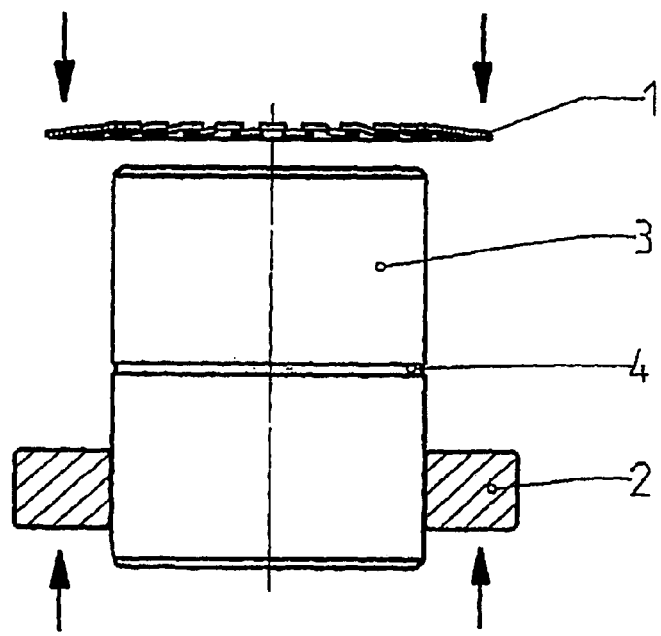

| | | |
|---|---|---|
| EP | 0 247 400 | 5/1987 |
| EP | 0 346 690 | 12/1989 |
| EP | 1 092 881 | 12/1989 |
| EP | 0 849 477 | 6/1998 |
| EP | 1 335 147 | 8/2003 |
| FR | 1 239 739 | 11/1959 |
| FR | 2 465 120 | 9/1979 |

PLATE SPRING, WHICH IS PREVENTED FROM BEING AXIALLY DISPLACED ON A CIRCULAR CYLINDRICAL SURFACE OF A RECEIVING BODY

CROSS REFERENCE TO RELATED APPLICATIONS

Applicant claims priority under 35 U.S.C. § 119 of German Application No. 103 23 577.9 filed on May 26, 2003. Applicant also claims priority under 35 U.S.C. § 365 of PCT/DE2004/001097 filed on May 26, 2004. The international application under PCT article 21(2) was not published in English.

The present invention relates to two components braced against each other according to the preamble of Patent Claim 1.

Known generic devices include not only the plate spring and the receiving body having a surface that is a circular cylinder in at least some sections but also include at least one separate axial stop element for the plate spring to be attached to the receiving body. Only a single stop element is required if the plate spring may be in contact at one end with a shoulder protruding radially out of the circular cylindrical surface. For example, a conventional standardized retaining ring may be used as a stop element to be mounted on the circular cylindrical surface. The circular cylindrical surface may be formed by the surface of a shaft or the inside circumferential surface of a borehole.

German Patent DE 852319 C has disclosed two components braced against each other, wherein a first component passes through a second component, whereby the two components are in rigid mutual contact at one end and are elastically braced against one another at the other end.

The elastic bracing is accomplished by a spring ring which is supported in a ring groove of the first component on the outside radially and has elastic feet on the inside radially, said elastic feet being in elastic contact with the respective end face of the first component. The spring ring is an open retaining ring, i.e., a retaining ring that is slotted on the circumference. Due to its radial flexibility, such an open retaining ring can be installed easily because it can be installed in a spread form in spring rings of the usual type. Such an open retaining ring is not suitable for generating high axial spring forces as pressing forces.

The present invention is concerned with the problem of being able to connect the two components to each other in the simplest possible way, producing the greatest possible bracing force.

This object is achieved by a design of and arrangement of the components required for the connection according to all the features of Patent Claim 1.

According to this invention, the plate spring is designed so that it can be snapped into a ring groove as a receiving groove as one of the two components to be joined together without prestressing the plate spring such that a material-damaging prestress occurs during installation in the case when the ring is snapped onto the inside circumference or snapped onto the outside circumference. This is accomplished according to this invention by the design and arrangement of radial spring feet arranged a distance apart on the circumference of the plate spring according to the characterizing-features of Claim 1.

On the whole, all the features of claim 1 are needed equally to achieve the object of the present invention. The characterizing feature b defines the distance of the receiving groove for the plate spring in a first component in comparison with the supporting area of the plate spring on the second component in such a manner that the elate spring can also exert an actual tension force.

Advantageous and expedient embodiments are the object of the dependent claims.

In axial spring deflection of a plate spring, its inside diameter is reduced while its outside diameter is increased. This means that a plate spring having a smaller inside diameter in comparison with the diameter of a shaft on which the plate spring is to be mounted will snap with its inside edge into a circumferential groove on the shaft when this plate spring is pushed onto the respective shaft with an application of force opposite the acting tension, and it will do so as soon as the inside edge of the plate spring reaches the circumferential groove.

Due to such snapping into a circumferential groove of a shaft, a means of bilaterally preventing axial displacement is practically already provided, if such a bilateral securing means is desired, although the present invention does not relate to that in this form.

If a plate spring that is prevented from being axially displaced in this way exerts a spring force from its concave side against an opposing body, then the inside diameter of the plate spring is to be designed with respect to the diameter of the circumferential groove so that there always remains a radial clearance between the base of the circumferential group and the inside edge of the plate spring over the entire axial spring path of the plate spring. If a progressive increase in spring force is desired after a preselectable spring force is exceeded, the diameter can be coordinated so that when a preselectable limit is exceeded, the radial clearance between the base of the circumferential groove and the inside edge of the plate spring is eliminated.

Since the inside diameter becomes larger when the plate spring undergoes deformation in the direction opposite the regular spring deflection, the means preventing axial displacement according to the present invention can be achieved easily if the plate spring can be pushed onto a shaft without any opposing force as far as the circumferential groove into which it is to be snapped.

The situation is somewhat different when, according to the fundamental problem on which the invention is based, the plate spring must be under tension already, for snapping into the circumferential groove, when coming in contact with an opposing body before being snapped into the circumferential groove. In this case, the plate spring must be able to expand elastically radially on the whole or an inside edge area of the plate spring must be provided, which can be deformed elastically in the axial direction with radial expansion at the same time before the plate spring snaps into the circumferential groove.

According to the present invention, for the application case mentioned last in particular, it is necessary for the inside circumference area of the plate spring to be divided on the circumference into spring webs spaced a distance apart from one another, each protruding freely in the radial direction. These radial spring webs can then undergo temporary elastic deformation for the snapping operation in a manner necessary for this purpose according to the present invention. Likewise, with a suitably defined geometry, the plate spring may yield elastically radially outward in the area of the spring webs for the snapping operation. To accomplish this, the ratio of the inside diameter to the outside diameter of the plate spring lateral surface should be as close to "one" as possible, and there should be a great distance between the spring webs. This can be achieved if the number of spring webs on the plate spring is reduced to between two and five, where the effect is improved with a decrease in the number. When there are only two spring webs, lateral slippage of the plate spring out of the circumferential groove must be prevented through additional measures. In addition, the transitional area from the spring webs to the lateral surface of the plate spring must be selected to be as narrow as possible. The proportional amount of these transitional areas on the circumference of the inside diameter of the lateral surface of the plate spring should not exceed 15%, or better yet, should be less than 12%, preferably even less than 10%.

In any case, a plate spring can be snapped into a circumferential groove especially easily if the plate spring is deflected as far as possible without undergoing permanent deformation, until the plate spring is turned upside down and the inside diameter can increase beyond that in the force-free state. A plate spring put under tension in this way can be shifted onto the shaft until the inside diameter or the spring webs engage in the circumferential groove with relaxation of the plate spring.

In the case of an axial displacement preventing means on the plate spring in a borehole, the outside circumference of the plate spring should be designed with spring webs accordingly.

Figure 2:
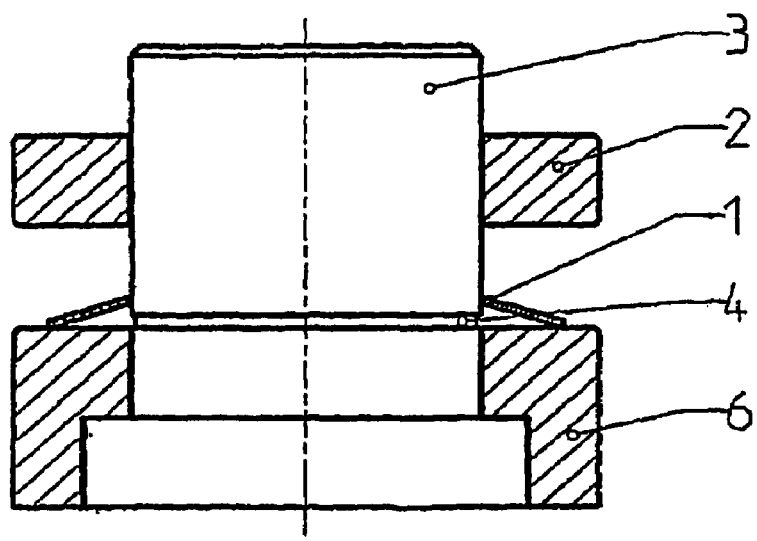

Exemplary embodiments illustrated in the drawing, but only that illustrated in FIG. 2 pertains to the object of the present invention.

Figure 1A:
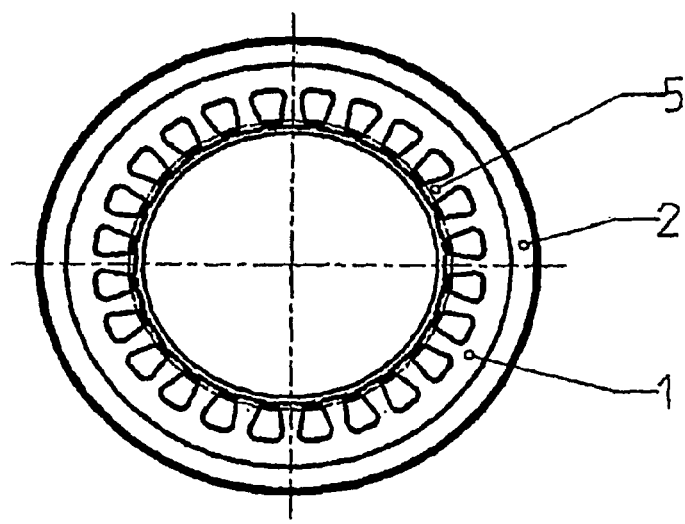

The drawings shows:

as background illustrations for an understanding of the present invention:

FIG. 1a a view of a plate spring secured axially on a shaft as seen in the axial direction of the shaft, FIG. 1b the plate spring according to FIG. 1a before being pushed onto the shaft, and to illustrate the actual object of the present invention:

FIG. 2 a longitudinal section through a shaft having a plate spring to be secured against a stop.

In the embodiment according to FIGS. 1a, 1b, the plate spring 1 may come to rest against an opposing body 2, which remains freely movable in the axial direction, or against such an opposing body 2, which should be in constant contact with the plate spring 1 under the spring force emanating from the plate spring. These two application cases do not constitute a fundamental difference with respect to assembly of the plate spring 1, i.e., pushing this plate spring 1 onto a shaft 3, if the plate spring 1 in the unstressed state can be pushed into the position of the displacement preventing means, in which position it is prevented from being displaced axially. When there is constant contact with the opposing body 2, this means that the plate spring 1 is mounted first, so that it is prevented from displacement before the opposing body 2 puts tension on the plate spring 1.

A circumferential groove 4 is provided in the shaft 3 in the area in which the position of the plate spring 1 is to be secured axially. In the are of its inside circumference, the plate spring 1 has a plurality of spring webs 5 arranged with a distance between them, so they protrude radially freely and are distributed uniformly in the area of the inside circumference of the plate spring. A plate spring 1 having an inside circumference designed in this way may also be referred to as an internally slotted plate spring 1.

A plate spring 1 installed for one of the two application cases according to FIG. 1 serves in one case to be able to support a freely mobile opposing body 2 when it strikes the plate spring 1. In the other case, the opposing body 2 is in contact with the plate spring 1 with spring tension, but contact-free assembly of the plate spring 1 is possible initially.

In the embodiment according to FIG. 2, the opposing body 6 is attached to the shaft 3 in an axially fixed manner prior to assembly of the plate spring 1, and after its assembly, the plate spring 1 is to be in contact with this opposing body 6 under tension. In this case, the plate spring 1 must be mounted on the opposing body 6, which is already axially locked in position, building up the spring tension, i.e., the plate spring must be snapped into the circumferential groove 4. In such a case, the inside circumference of the plate spring 1 is reduced when it is put under tension, so either the plate spring 1 must be able to expand radially on the whole or the inside circumferential area of the plate spring 1 must be designed in the manner of elastic spring webs 5, for example, which must be able to undergo elastic deformation in the axial direction before being snapped into the circumferential groove 4, or the plate spring must be elastically invertable to the extent that its inside diameter again increases and it is pushed forward onto the shaft with the inside diameter snapping into the groove, where it engages with a reduction in the inside diameter.

The invention claimed is:

1. Two components (3, 6) braced against one another in one direction, under the force of a plate spring (1) mounted to be secured against axial displacement, of which a first component (3) of these components passes through a second (6) in this direction, as an accommodation body for the plate spring (1), in a surface that is cylindrical, at least in segments, wherein
   the plate spring (1) is configured radially on the outside as a circular ring segment that is closed in the circumference direction,
   a circumferential groove (4) for accommodation and axial fixation of the radial inner and outer region of the plate spring (1) is provided in the circular-cylindrical surface region of the accommodation body formed by the first component (3), whereby this inner region of the plate spring (1) serves as its fixation region,
   the ring flank of the circumferential groove (4) that supports the plate spring (1) is disposed within the first component (3) that serves as an accommodation body, at a distance from the contact surface of the plate spring (1) on the second component (6), which corresponds to the height of the plate spring in a biased state during assembly,
   the plate spring (1) is broken up, in its fixation region, into a plurality of spring webs (5) that stand freely away radially, in each instance, and are spaced apart from one another,
   wherein the transition regions of the spring webs (5) to the closed, outer mantle surface of the plate spring (1) jointly take up a proportion of not more than 15% of the inside circumference of the closed, outer mantle surface of the plate spring.

2. Two components braced relative to one another according to claim 1,
   wherein the transition regions of the spring webs (5) on the inside circumference surface of the closed, outer mantle surface jointly take up a proportion that is not greater than 12%.

3. Two components braced relative to one another according to claim 2, wherein the transition regions of the spring webs (5) on the inside circumference surface of the closed, outer mantle surface jointly take up a proportion that is not greater than 10%.

4. Two components braced relative to one another according to claim 1,
wherein play exists between the base of the circumferential groove (4) and the facing edge of the plate spring, up to an axial tensile force that acts on the plate spring (1), which force can be predetermined.

5. Two components braced relative to one another according to claim 4,
wherein if a predetermined axial force that acts on the plate spring (1) is exceeded, the base of the circumferential groove (4) makes contact with the facing edge of the plate spring (1).

* * * * *